United States Patent [19]

Hacker et al.

[11] 4,002,797

[45] Jan. 11, 1977

[54] LUBRICANT FOR WIRES WITH ENAMELED OR LACQUERED INSULATION

[75] Inventors: Heinz Hacker, Nurnberg; Ernst Helwig, Bad Neustadt, both of Germany

[73] Assignee: Siemens Aktiengesellschaft, Munich, Germany

[22] Filed: Feb. 26, 1975

[21] Appl. No.: 553,125

[30] Foreign Application Priority Data

| | | |
|---|---|---|
| Mar. 1, 1974 | Germany | 2409979 |
| Jan. 31, 1975 | Germany | 2504044 |

[52] U.S. Cl. .................... 428/378; 428/379; 428/380; 428/383; 174/120 R; 260/249.5

[51] Int. Cl.[2] .................... D02G 3/00; B32B 15/00

[58] Field of Search .......... 260/249.5; 174/120 R; 428/378, 379, 380, 383

[56] References Cited

UNITED STATES PATENTS

| | | | |
|---|---|---|---|
| 2,481,155 | 9/1949 | Schaefer | 260/249.5 |
| 2,508,323 | 5/1950 | Adams | 260/249.5 |
| 2,510,503 | 6/1950 | Kropa | 260/249.5 |
| 2,513,264 | 6/1950 | Holm-Hansen | 260/249.5 |
| 2,537,816 | 1/1951 | Dudley | 260/249.5 |
| 2,767,239 | 10/1956 | Kennedy | 174/68 C |
| 3,050,496 | 8/1962 | D'Alelio | 260/249.5 |
| 3,729,448 | 4/1973 | Seltzer et al. | 260/249.5 |
| 3,775,175 | 11/1973 | Merian | 428/379 |
| 3,818,006 | 6/1974 | Klemchuk | 260/249.5 |

*Primary Examiner*—George F. Lesmes
*Assistant Examiner*—William R. Dixon, Jr.
*Attorney, Agent, or Firm*—Kenyon & Kenyon Reilly Carr & Chapin

[57] ABSTRACT

Lubricants for lacquered wires are provided comprising compounds of the type A-C-B, which compounds at room temperature have an ointment or soap-like consistency, wherein A is a chemical grouping containing reactive groups which permit chemical incorporation in a polymerizable impregnating resin system, B is a saturated or unsaturated aliphatic hydrocarbon radical, and C is a binding member in the form of a carbon, nitrogen, oxygen, or sulfur grouping.

The lubricant is advantageously a 2,4-dienoxy-6-aminoalkyl (-ene)-s-triazine, particularly 2,4-dienoxy-6-aminostearyl-s-triazine. Such triazines are also useful according to another embodiment of the invention as lubricants for wire with enamel insulation.

9 Claims, No Drawings

LUBRICANT FOR WIRES WITH ENAMELED OR LACQUERED INSULATION

BACKGROUND OF THE INVENTION

This invention is concerned with lubricants for wires with lacquer and enamel insulation.

Lacquered and enameled wires, i.e. wires with lacquer or enamel insulation, have a thin lacquer or enamel film, as blister- and pore-free as possible, whose thickness is established according to standard regulations. The lacquer film serves to insulate the turns of a coil of wire from one another. Lacquered and enameled wires for electrical machine construction, and also those for low-voltage engineering, are subjected to high stress during their fabrication or during winding on automatic winders or when being inserted into grooves of stators or rotors of electric machines.

To avoid damage to the wire insulation during fabrication and to permit satisfactory winding, the wires are coated with lubricants. Thereby the mechanical forces acting on the lacquer or enamel coating are reduced.

In electric machine construction it is customary, in order to enhance electrical and mechanical-thermal properties, to impregnate the windings by immersion or trickling methods with unsaturated polyester or epoxy resins, and then to bake them in a tempering or annealing process.

Lubricants known in the art, especially paraffin-based lubricants, greatly reduce the strength of the bond between lacquered or enameled wire and impregnating resin. The lubricants possess the undesirable property of forming a kind of separating layer between the impregnating resin and the lacquered or enameled wire. The strength reduction can be shown clearly in switching tests on electric motors, when comparing testpieces with lubricant-free windings with testpieces whose windings are provided with lubricants. An additional operation to remove the lubricants before the impregnation or immersion process, whereby the above-mentioned difficulties could be eliminated, is economically unacceptable on a large scale.

SUMMARY OF THE INVENTION

It is an object of this invention to provide a lubricant for wires having a lacquered or enamelled insulation which lubricant does not reduce the bond between the lacquered or enameled wire and impregnating resin.

This object is achieved according to one embodiment of this invention by a lubricant for wires with lacquer insulation comprising a compound of the type A-C-B which at room temperature has an ointment or soap-like consistency, wherein A represents a chemical grouping with reactive groups which permit chemical incorporation in a polymerizable impregnating resin system, B represents a saturated or unsaturated aliphatic hydrocarbon radical, and C represents a binding member in the form of a divalent carbon, nitrogen, oxygen or sulfur grouping.

This object is achieved according to another embodiment of the invention by a lubricant for wires with enamel insulation comprising at least one 2,4-dienoxy-6-aminoalkyl (-ene)-s-triazine.

The compounds used as lubricants according to this invention can be both single compounds as well as mixtures of these compounds. They are chemically incorporated into the resin matrix of the impregnating resin during the baking process. In this way a good bond between lacquered or enameled wire and insulating resin is made possible. The lubricant function is ensured by the fact that the compounds to be used according to the invention have an ointment or soap-like consistency at room temperature. These compounds have a melting point approximately in the range between 35° and 65° C and have friction coefficients, $\mu$, (according to DIN 46453 paragraph 11.2) between 0.09 and 0.2. Apart from an excellent lubricant effect, these compounds have the further advantage that they have no or only negligibly little tackiness. This makes them superior for example to oligomerized unsaturated polyesters. Experiments with such polyesters have shown that no satisfactory results can be achieved. The surface tackiness of the lubricant films produced therewith, entails considerable problems in the wire fabrication process. Moreover, during transport heavy fouling occurs and the guide rolls stick during winding.

The compounds used as lubricants for lacquered wires according to this invention may be represented by the formula A-C-B. The group A is essentially the carrier of the functional groups which permit chemical incorporation into the network of the impregnating resin during the baking process. When using impregnating resins based on unsaturated polyesters, these groups are incorporated into the resin matric by radical initiation during the baking process. Preferably the chemical group A contains at least one ethylenically-unsaturated group. When using additively hardening impregnating resins, such as, epoxy or urethane resins, the functional groups preferably contain reactive hydrogen atoms.

Group B is essentially the carrier of the pure lubricant function. Group B comprises a saturated or unsaturated aliphatic hydrocarbon radical, i.e. an alkyl, alkenyl or alkynyl radical. To obtain good lubricant properties, B advantageously contains from 8 to 24 carbon atoms, preferably 14 to 20 carbon atoms. B is advantageously a lauryl or stearyl radical.

The bridge or bonding member C bonded between the function carriers A and B, is a divalent carbon, nitrogen, oxygen or sulfur grouping. The term "carbon grouping" includes both a bridge in the form of a carbon atom

as well as a bridge in the form of a carbonyl group

and an ester group

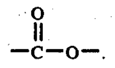

The term "nitrogen grouping" includes nitrogen

the imide structure

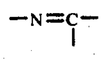

Typical examples of group A are derivatives of the following compounds, as shown by formulas 1 to 14 below: Isocyanic acid (1), benzene-carboxylic acids (2), cyclohexane carboxylic acids (3), cinnamic acid (4), benzene (5), maleic acid (6), fumaric acid (7) itaconic acid (8), methacrylic acid (9), acrylic acid (10) maleic acid monoallyl ester (11), mono or di-esters of glycerin (12), propylene (13) and ethylene (14).

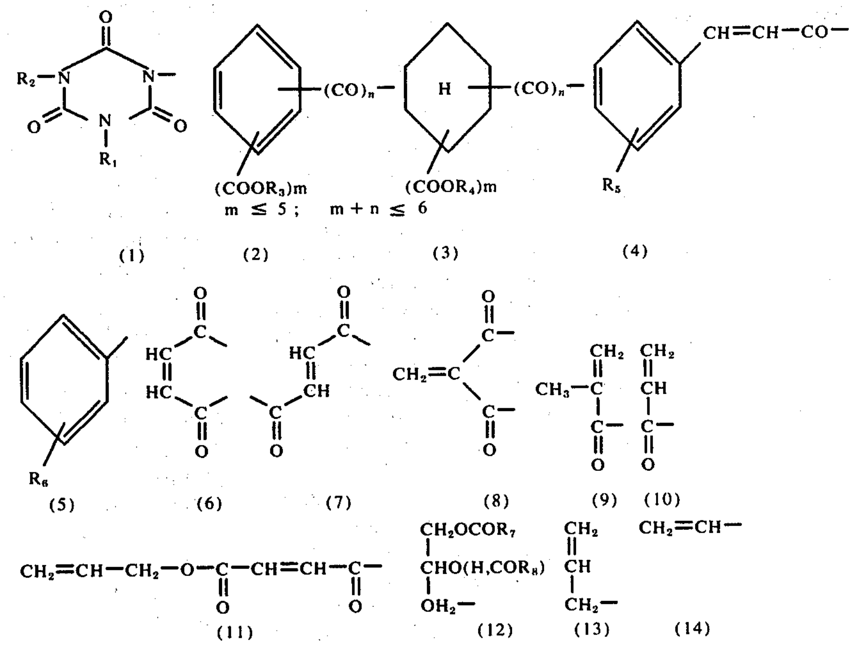

$m \leq 5$; $m + n \leq 6$ (1) (2) (3) (4)

(5) (6) (7) (8) (9) (10)

(11) (12) (13) (14)

and the urethane structure

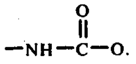

The oxygen grouping is preferably an ether linkage —O—. The term "sulfur grouping" includes the thioether structure —S—, the sulfoxide structure —SO— and the sulfone structure $—SO_2—$.

The two free valences, *x*, of the carbon grouping,

may be occupied by organic radicals or hydrogen. The free valence, Y, on the nitrogen grouping,

may be bound to an alkyl radical with 1 to 20 carbon atoms, to an alkylene cycloalkane group having 4 to 10 carbon atoms, to an alkylene aryl or heteroaryl group having 7 to 10 carbon atoms, to an alkenyl or alkynl group having from 3 to 16 carbon atoms or to hydrogen.

When using impregnating resins cross-linked by free radical reactions compounds are preferably used wherein at least one of the radicals $R_1$ to $R_8$ has a polymerizable multiple bond. Examples of such radicals are the allyl, methallyl, ethallyl, propallyl, 3-ethyl-butenyl-2, 2,4-hexadienyl, crotyl, and nonenyl radicals.

When using impregnating resins crosslinked by addition reactions, such as epoxy or urethane-based resins, the radicals $R_1$ to $R_8$ preferably carry groups with reactive H atoms, such as —NH—, $—NH_2$, —COOH or —OH. In the presence of bonding member C as a nitrogen grouping, however, the lubricant molecule may contain the reactive H atom alternatively in the form —NH— or —NH—COO—.

Characteristic examples of compounds of the type A-C-B to be used as lubricants for lacquered wires according to the invention are:

a. For impregnating resins crosslinked by free radical reactions: diallyl stearyl isocyanurate, 1-carboallyloxy-3,4-dicarbostearyloxy-benzene (ester of trimellitic acid), maleic acid dilauryl ester, maleic acid distearyl ester, fumaric acid, dilauryl ester, fumaric acid laurylstearylester fumaric acid distearyl ester, N-laurylmaleimide N-stearyl maleimide, stearyl, layryl, myristyl, and cetyl esters of cinnamic acid. N-mono or distearyl lauryl, cetyl or myristyl esters of cinnamic acid amide as well as multivalent alcohols polyesterified with higher saturated fatty acids having from 10 to 24 carbon atoms alone or in mixture with unsaturated fatty acids having from 18 to 24 carbon atoms wherein at least one hydroxyl group is esterified with an ethylenically unsaturated carboxylic acid, e.g. methacrylic or acrylic acid;

b. For impregnating resins crosslinked by addition reactions: 1-carboxy-3,4-dicarbostearyloxy benzene, N,N'-distearyl, myristyl lauryl, or cetyl malonic acid diamide, N,N'-distearyl, myristyl, lauryl or cetyl phenylene diamine, phthalic acid stearyl, lauryl, myristyl, or cetyl mono esters, hexahydrophthalic acid stearyl, lauryl, myristyl or cetyl mono esters, N,N'-distearyl, lauryl, myristyl or cetyl, hexahydrophthalic acid diamide and N-stearyl-aniline as well as multi-valent alcohols poly-esterified with higher saturated fatty acids having from 10 to 24 carbon atoms alone or in mixture with unsaturated fatty acids having from 18 to 24 carbon atoms where a half-ester bond to a di or polycarboxylic acid through at least one hydroxyl group exists.

For use with radical crosslinked impregnating resins cinnamic acid esters of lauryl, myristyl, cetyl and stearyl alcohol are well suitable. When using polyurethane-based impregnating resins, lubricants with reactive H atoms in OH, NH or $NH_2$ bonds are preferred.

Especially well suited for use as lubricants are compounds whose binding member, C, is an N- substituted amine, particularly 2,4-dienoxy-6-amino alkyl (-ene)-s-triazines represented by the formula:

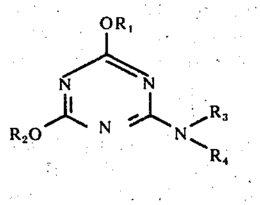

Wherein $R_1$ and $R_2$ is each a radical selected from the group consisting of allyl, methallyl, ethallyl, propallyl, 3-ethylbutenyl-2,3-butenyl, 2,4-hexadienyl, crotyl and nonenyl:

$R_4$ is alkyl group having from 1 to 20 carbon atoms, an alkylene cycloalkane group having from 4 to 10 carbon atoms, an alkylene aryl or heteroaryl group having 7 to 10 carbon atoms and an alkenyl or alkynyl group having from 3 to 16 carbon atoms;

$R_3$ is a hydrogen radical or alkylene group which may cyclically be connected with $R_4$, and wherein individual methylene groups in said alkylene group can be substituted by divalent oxo or thio groups. Such compounds are remarkable in that their tackiness is negligibly low. Very good results are obtained particularly with 2,4-dienoxy-6-aminostearyl-s-triazines, preferably 2,4-diallyloxy-6-aminostearyl-s-triazine.

In the case of enameled wires, according to this invention, the above-mentioned 2,4-dienoxy-6-amino alkyl (-ene)-s-triazines are advantageously employed as the lubricant. Preferably, a 2,4-dienoxy-6-aminoalkyl (-ene)-s-triazine wherein $R_3 = H$ and $R_4 =$ lauryl, stearyl or alkyl groups having an average carbon content of from 14 to 18 carbon atoms are used. If epoxy impregnating resins are used, 2,4-dienoxy-6-amino alkyl (-ene)-s-triazines wherein $R_3$ is H must be used.

The preparation of 2,4-dienoxy-6-aminoalkyl (ene)-s-triazines is described in U.S. Pat No. 2,537,816 and in German Offenlegungschrift No. 2,308,560.

The lubricants for enamelled wires are chemically incorporated into the resin matrix of the impregnating resin during the baking. At room temperature, they have an ointment or soap-like consistency. In addition to an excellent lubricating effect, they have no, or negligibly little stickiness in comparison with oligomerized polyester resins. They therefore have little or no tendency to attract dirt during the fabrication process or during transport.

The use of the s-triazine compounds as lubricants for wires with enamel insulation are particularly advantageous, in that in the monomer form they are completely inert against the insulation film. In the case of impregnating resins with an unsaturated polyester and epoxy base, the relatively low double bond equivalent or the amino hydrogen of these compounds, respectively ensures a rapid and reliable incorporation into the impregnating resin matrix. Further advantages are that the lubricants for enamel insulated wires according to the invention are highly compatible with customary casting, embedment, impregnating and drip resins with an unsaturated polyester and/or epoxy resin base.

The use according to invention of compounds of type A-C-B as lubricants for wires with lacquer insulation is found to be particularly advantageous for the additional reason that in monomeric form these compounds are completely inert to the lacquer layer. Further, the relatively low double bond equivalent or respectively the amine hydrogen of these compounds in the case of impregnation resins based on unsaturated polyester and epoxy resins ensures rapid and secure incorporation into the impregnation resin matrix. Other advantages are that the compounds used according to the invention are equally well compatible with the usual casting, embedding, impregnating and trickling resins based on unsaturated polyester and/or epoxy resins. Such lubricants greatly improve the mechanical and electrical properties of windings, in particular of motor, transformer, and coil windings, because they ensure good baking of these windings. Thus, in motor windings of lacquered wires fabricated with a lubricant according to the invention, the number of reversals can be increased from 400,000 to more than 1,000,000 before the motors fail. Another advantage of the lubricants according to the invention is that by a variation in the chemical structure an adaptation to specific requirements is easily possible.

The coating of the lacquered wires with the lubricant is generally carried out by applying a solution of the lubricant on the wires, for example, by brushing with a wick, and subsequently removing the solvent. For this there may be used, for example, a 3% (wt. %) solution in a mixture of ligroin and toluene.

With reference to the results of two test series, the following illustrates the improvement of the electrical and mechanical properties obtainable with the use of lubricants according to the invention.

EXAMPLE 1

To test the adhesion between a wire lacquer and an impregnating resin, a wire bundle test is utilized. For this purpose, rod-shaped wire strand bundles of dimensions 10 mm × 15 mm × 150 mm, containing a defined number of conductors, are impregnated with an unsaturated polyester resin (UP resin). On a testing machine with a bending device the wire strand bundles are then subjected to a bending stress with a force-path diagram being plotted. In comparison tests between wire strand bundles (I) of impregnated lacquered wires with conventional paraffin-based lubricants, corresponding wire strand-bundle (II) of lacquered wires whose lubricant had been washed off before the impregnation, and wire strand bundles (III) of lacquered wires with a lubricant according to the invention in the form of 2,4-diallyloxy-6-aminostearyl-s-triazine ($u = 0.13$), the latter show a more than two fold improvement in bending stiffness. (N)

Table I below compares measured values obtained at room temperature from wire strand bundles of the above mentioned dimensions with lacquered wires 1.06 mm thick, namely in each case the maximum of the force-path diagram.

| Sample | Lacquer | Impregnating Resin | Clamped Length(mm) | Bending Radius(mm) | Maximum (N) |
|---|---|---|---|---|---|
| I | Polyester imide | UP resin | 120 | 10 | 765 |
| II | Polyester imide | UP resin | 120 | 10 | 1088 |
| III | Polyester imide | UP resin | 120 | 10 | 1836 |

EXAMPLE 2

In a second test series, so-called reversing tests are carried out on electrical machines, electric motors running reversingly to the right and left. The intervals between switching operations are selected so that the temperature rise of the winding corresponds to the respective insulating material class. As an example, the occurring winding load of a winding designed for 11 kW 220/380 V (Δ/Y), i.e. for 11 kW and 220 V in delta connection or 380 V in Y connection, is about 1000 V and 180 A in the switching operation. In these reversing tests using the motor windings of lacquered wires fabricated with 2,4-diallyloxy-6-amino stearyl-s-triazine, the number of reversals could be increased from 400,000 to more than 1,000,000 before the motors fail.

What is claimed is:

1. A lacquered wire having a lubricant film thereon; said lubricant having an ointment or soap-like consistency at room temperature and having a melting point between about 35° and 65° C comprising a compound of the formula A-C-B wherein A is a chemical grouping, having at least one ethylenically unsaturated group or having at least one reactive hydrogen atom which permit chemical incorporation into a polymerizable impregnating resin system; B is a saturated or unsaturated aliphatic hydrocarbon radical having from 8–24 carbons, and C is a binding member in the form of a divalent radical containing an element selected from the group consisting of carbon, nitrogen, oxygen and sulfur.

2. The lubricant of claim 1 wherein binding member C contains at least one reactive hydrogen atom.

3. The lubricant of claim 1 wherein said binding member C is an N-substituted amine.

4. The lubricant of claim 3 comprising a 2,4-dienoxy-6-aminoalkyl (-ene)-s-triazine of the general formula:

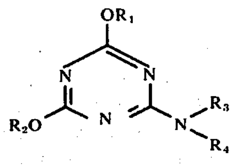

Wherein $R_1$ and $R_2$ is each a radical selected from the group consisting of allyl, methallyl, ethallyl, propallyl, 3-ethylbutenyl-2,3-butenyl, 2,4-hexadienyl, crotyl and nonenyl; $R_4$ is an alkyl group having 1 to 20 carbon atoms, an alkylene cycloalkane group having from 4 to 10 carbon atoms, an alkylene aryl or heteroaryl group having from 7 to 10 carbon atoms or an alkenyl or alkynyl group having from 3 to 16 carbon atoms; $R_3$ is a hydrogen radical or an alkylene group which can cyclically be connected with $R_4$, and wherein individual methylene groups in said alkylene group can be substituted by divalent oxo or thio groups.

5. The lubricant of claim 4 wherein said 2,4-dienoxy-6-amino alkyl(ene)-s-triazine is 2,4-diallyloxy-6-aminostearyl-s-triazine.

6. The lubricant of claim 1 wherein hydrocarbon radical B comprises from 14 to 20 carbon atoms.

7. The hydrocarbon radical of claim 1 selected from the cinnamic acid esters of lauryl, myristyl, cetyl and stearyl alcohol.

8. An enameled wire having a lubricant film thereon having an ointment or soap like consistency at room temperature said lubricant comprising a 2,4-dienoxy-6-aminoalkyl (-ene)-s-triazine of the formula:

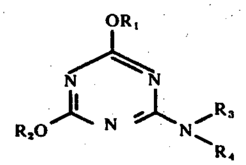

Wherein $R_1$ and $R_2$ is each a radical selected from the group consisting of allyl, methallyl, ethallyl, propallyl, 3-ethylbutenyl-2,3-butenyl, 2,4-hexadienyl, crotyl and nonenyl;

$R_4$ is alkyl group having from 1 to 20 carbon atoms, an alkylene cycloalkane group having from 4 to 10 carbon atoms, an alkylene aryl or heteroaryl group having from 7 to 10 carbon atoms and an alkenyl or alkynyl group having from 3 to 16 carbon atoms;

$R_3$ is a hydrogen radical or alkylene group which can cyclically be connected with $R_4$, and wherein individual methylene groups in said alkylene group can be substituted by divalent oxo or thio groups.

9. The lubricant of claim 8 wherein $R_3 = H$ and $R_4$ is selected from the group consisting of lauryl, stearyl and alkyl having an average number of carbon atoms of from 14 to 18.

* * * * *